(12) United States Patent
Laceky

(10) Patent No.: US 9,423,668 B2
(45) Date of Patent: Aug. 23, 2016

(54) SYSTEM AND METHOD USING CAPACITORS TO POWER A CAMERA HAVING A MOTION SENSOR

(71) Applicant: Battery-Free Outdoors, LLC, Austin, TX (US)

(72) Inventor: William P. Laceky, Georgetown, TX (US)

(*) Notice: Subject to any disclaimer, the term of this patent is extended or adjusted under 35 U.S.C. 154(b) by 0 days.

(21) Appl. No.: 13/961,157

(22) Filed: Aug. 7, 2013

(65) Prior Publication Data

US 2013/0322864 A1 Dec. 5, 2013

Related U.S. Application Data

(63) Continuation of application No. 12/339,224, filed on Dec. 19, 2008, now Pat. No. 8,525,469, which is a continuation-in-part of application No. 11/865,772, filed on Oct. 2, 2007, now Pat. No. 7,844,866, which is a continuation of application No. 10/885,550, filed on Jul. 6, 2004, now Pat. No. 7,275,501.

(60) Provisional application No. 61/015,188, filed on Dec. 19, 2007, provisional application No. 60/485,300, filed on Jul. 3, 2003.

(51) Int. Cl.
| | |
|---|---|
| G03B 7/26 | (2006.01) |
| H02J 7/34 | (2006.01) |
| H02J 7/35 | (2006.01) |
| H01M 10/44 | (2006.01) |

(52) U.S. Cl.
CPC ............... G03B 7/26 (2013.01); H02J 7/345 (2013.01); H02J 7/35 (2013.01); H01M 10/44 (2013.01)

(58) Field of Classification Search
CPC .. G03B 7/26; G03B 2217/007; G03B 7/083; G03B 7/091; G02B 7/08
USPC ........................................................ 396/304
See application file for complete search history.

(56) References Cited

U.S. PATENT DOCUMENTS

| | | | |
|---|---|---|---|
| 4,328,456 A * | 5/1982 | Suzuki et al. ............... 320/101 |
| 4,434,395 A | 2/1984 | Higuchi ....................... 320/166 |
| 4,589,754 A * | 5/1986 | Maitani et al. ............... 396/290 |
| 4,616,320 A | 10/1986 | Kerr et al. ..................... 702/14 |
| 4,686,619 A | 8/1987 | Edwards ...................... 363/126 |
| 4,720,799 A | 1/1988 | Woithe et al. ................. 702/55 |
| 4,785,436 A | 11/1988 | Sase ............................ 368/205 |
| 4,859,982 A | 8/1989 | Seaburg ....................... 340/475 |
| 4,963,811 A | 10/1990 | Weber .......................... 320/101 |
| 5,143,289 A | 9/1992 | Gresham et al. ................. 239/7 |
| 5,426,355 A | 6/1995 | Zweighaft .................... 318/364 |
| 5,442,794 A | 8/1995 | Wisor et al. .................. 713/340 |
| 5,594,313 A | 1/1997 | Takeda ......................... 320/166 |
| 5,604,426 A | 2/1997 | Okamura et al. ............. 323/282 |
| 5,621,248 A | 4/1997 | De Villiers ..................... 290/30 |
| 5,661,349 A | 8/1997 | Luck ............................ 307/151 |
| 5,686,809 A * | 11/1997 | Kimura et al. ............... 320/101 |
| 5,783,928 A | 7/1998 | Okamura ..................... 320/122 |
| 5,825,157 A | 10/1998 | Suzuki ......................... 320/101 |
| 5,828,201 A | 10/1998 | Hoffman et al. ............. 320/104 |
| 6,096,969 A * | 8/2000 | Fujita et al. .................. 136/259 |
| 6,341,354 B1 | 1/2002 | Lee .............................. 713/324 |
| 6,367,259 B1 | 4/2002 | Timm ......................... 60/641.8 |
| 6,385,069 B2 | 5/2002 | Miettinen et al. ............ 363/157 |
| 6,429,621 B1 | 8/2002 | Arai ............................. 320/101 |
| 6,448,489 B2 | 9/2002 | Kimura et al. ............... 136/244 |
| 6,456,320 B2 | 9/2002 | Kuwano et al. .............. 348/143 |
| 6,515,876 B2 | 2/2003 | Koike et al. ............... 363/21.16 |
| 6,777,917 B2 | 8/2004 | Desprez et al. .............. 320/167 |
| 6,814,029 B1 | 11/2004 | Chesser ...................... 119/57.91 |
| 6,838,923 B2 | 1/2005 | Pearson ....................... 327/309 |
| 6,847,834 B1 | 1/2005 | Leem ........................... 455/572 |
| 7,149,422 B2 | 12/2006 | Schnell ........................ 396/153 |
| 7,275,501 B1 | 10/2007 | Laceky ...................... 119/57.92 |
| 7,609,952 B2 | 10/2009 | Jezierski et al. ............... 396/56 |
| 8,525,469 B1 | 9/2013 | Laceky ........................ 320/101 |
| 2002/0084767 A1 | 7/2002 | Arai ............................. 320/101 |
| 2002/0185074 A1 | 12/2002 | Bernard .................... 119/51.01 |
| 2003/0093805 A1 | 5/2003 | Gin .............................. 725/105 |
| 2003/0094931 A1 | 5/2003 | Renyolds ..................... 323/285 |
| 2004/0021446 A1 | 2/2004 | Bang et al. ................... 320/166 |
| 2004/0183379 A1 | 9/2004 | Sinha ........................... 307/64 |
| 2004/0216681 A1 | 11/2004 | Lesher ....................... 119/51.13 |
| 2005/0151851 A1 | 7/2005 | Schnell ....................... 348/208.4 |
| 2006/0197507 A1 | 9/2006 | Wang ........................... 320/166 |

* cited by examiner

*Primary Examiner* — Arun Williams
(74) *Attorney, Agent, or Firm* — Norton Rose Fulbright US LLP

(57) ABSTRACT

A method and apparatus relates to systems powered by energy stored in capacitors. The capacitors may be charged using any desired power source. In one example, a camera system uses a combination of solar panels and a capacitive network to power the camera system with minimal required maintenance.

17 Claims, 7 Drawing Sheets

SYSTEM AND METHOD USING CAPACITORS TO POWER A CAMERA HAVING A MOTION SENSOR

CROSS REFERENCE TO RELATED APPLICATIONS

This application is a continuation of U.S. patent application Ser. No. 12/339,224, filed Dec. 19, 2008, which is a continuation-in-part of co-pending, commonly owned U.S. patent application Ser. No. 11/865,722 filed on Oct. 1, 2007, entitled "SYSTEM AND METHOD USING CAPACITORS TO POWER AN AUTOMATIC FEEDER SYSTEM," (pending) which is a continuation of co-pending commonly owned U.S. patent application Ser. No. 10/885,550 filed on Jul. 6, 2004, entitled "SYSTEM AND METHOD USING CAPACITORS TO POWER AN AUTOMATIC FEEDER SYSTEM," (U.S. Pat. No. 7,275,501), which claims priority under 35 U.S.C. §119 to co-pending, commonly owned U.S. provisional patent application Ser. No. 60/485,300 filed on Jul. 3, 2003, entitled "BATTERY-LESS POWER CONTROL SYSTEM FOR AUTOMATIC GAME AND WILDLIFE FEEDERS." This application also claims priority under 35 U.S.C. §119 to co-pending, commonly owned U.S. provisional patent application Ser. No. 61/015,188 filed on Dec. 19, 2007, entitled "SYSTEM AND METHOD USING CAPACITORS TO POWER A CAMERA HAVING A MOTION SENSOR." Each of these applications are incorporated by reference herein.

BACKGROUND OF THE INVENTION

This description relates to systems that store and use energy. In one example, this relates to cameras that are triggered by motion sensors. These types of camera are commonly known as "trail cameras," "wildlife cameras," "game cameras," "scouting cameras," etc. One example of a trail camera is described in U.S. Pat. No. 6,735,387, which is incorporated by reference herein.

Typical trail cameras are powered by batteries, which must be replaced periodically. Trial cameras deplete batteries quickly. For example, trail cameral batteries may typically be changed within 60-90 days on some cameras.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The present invention provides a novel way to power a trail camera using one or more high capacity capacitors charged by an energy source (e.g., solar panels, fuel cells, etc.). An exemplary power source based on capacitors is described in the parent application, published as U.S. Pat. No. 7,275,501 entitled "System and Method Using Capacitors to Power an Automatic Feeder System," which is incorporated by reference herein. Briefly, in one example, a trail camera of the present invention is powered by one or more capacitors. In one example, the capacitors are charged by one or more solar panels. In some examples, the tail camera is capable of operating without the use of batteries.

In one example, the circuits described here can be integrated into a solar panel module where solar energy is stored in capacitors, converted to a usable voltage and current levels and delivered to the external power input connection (available on most wildlife cameras) via a cable.

This module can also include a timer/clock circuit that a user can use to define specific times that power be delivered to run the camera. Thus giving users the ability to conserve energy that would normally be spent powering the camera during non-active times for wildlife of interest. This ability to conserve power until predetermined times can allow a user to capture images of wildlife in the area during the users time of interest (typically early morning and late evening). Without this timer/clock the camera would run until the energy would be depleted so low that it could no longer power the camera. This also saves costs of additional solar panels and capacitors that would be required to power the camera under extreme usage or extended inclement weather. Extreme usage would be if during the night an animal or animals persisted in range of the camera causing the camera to repeatable trigger and draw power throughout the night or beyond typical amounts. Extended inclement weather can cause re-charging times to be too long to fully replenish energy lost during the night.

The same features and circuitry described above can be integrated into the camera either working as the primary source of power for the camera or working in conjunction with a battery or batteries (i.e. batteries could be used as a backup power source) taking the load off of the batteries thus extending the life of the batteries.

A wildlife camera can be designed with the circuit(s) described which run continuously or until capacitor power is deplinished or a wildlife camera can be designed with a user selectable function that allows users to set predetermined times for the camera to become active, thus conserving energy for these priority times.

Figure 1:
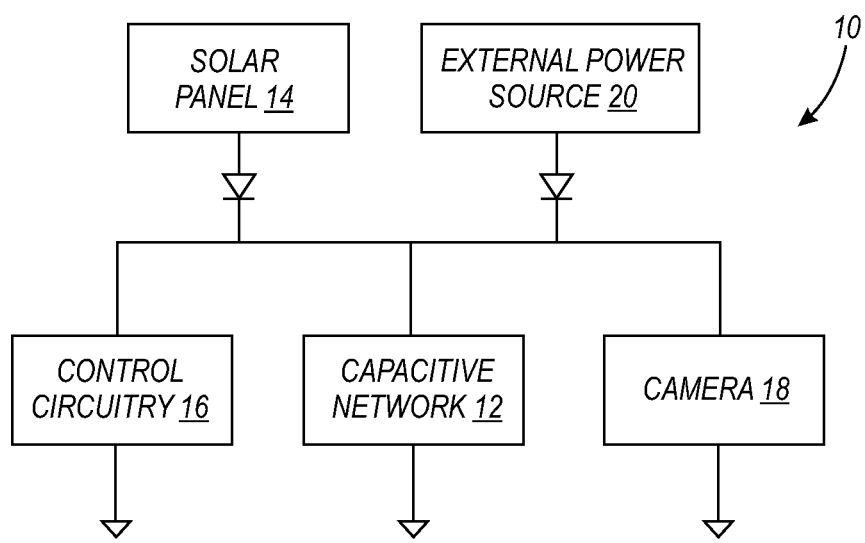
FIG. 1 is a block diagram of a camera system using capacitive energy storage.
Figure 5:
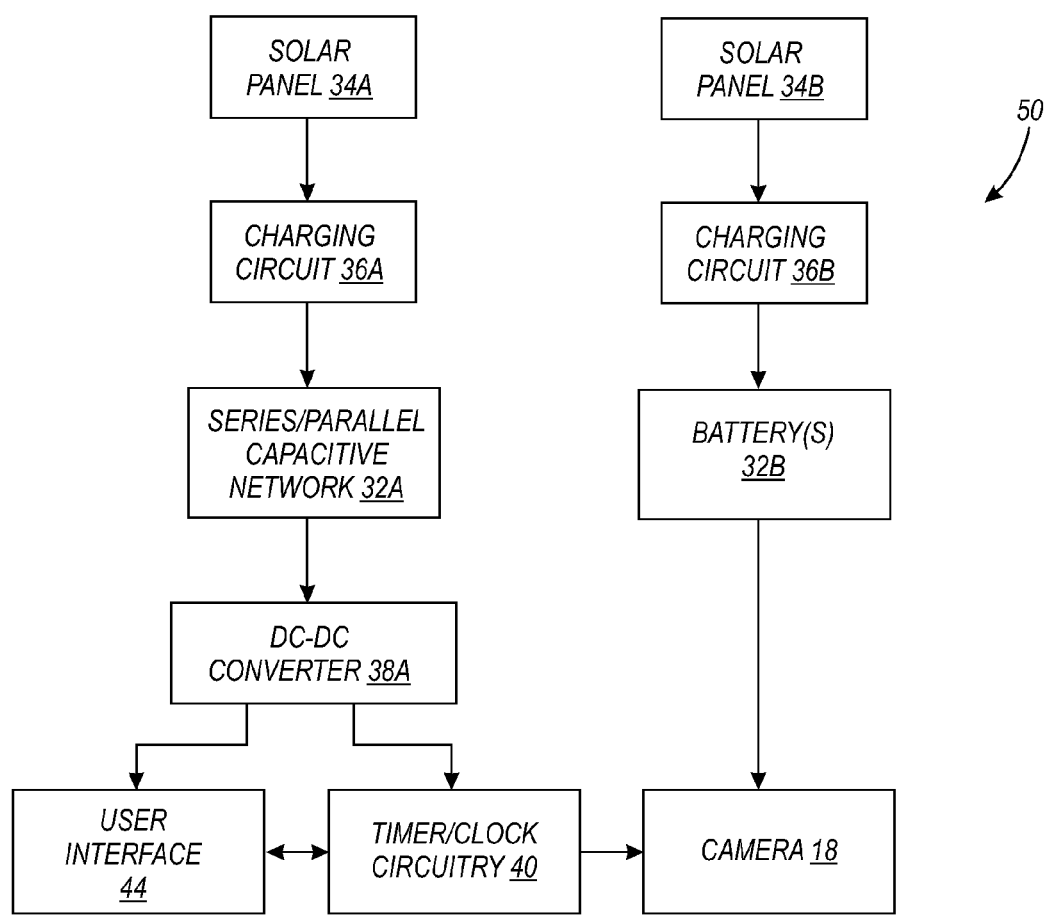
FIG. 5 is a block diagram of another example of a camera system using capacitive energy storage
Figure 6:
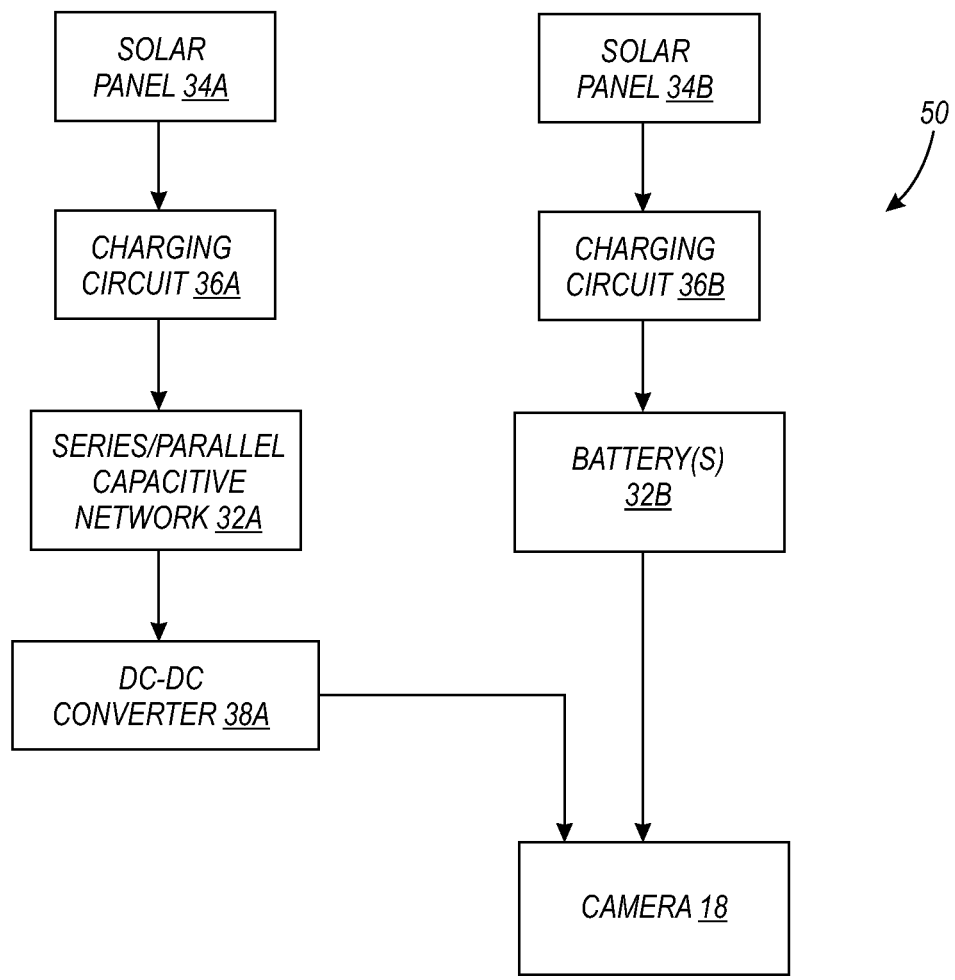
FIG. 6 is a block diagram of another example of a camera system using capacitive energy storage
Figure 7:
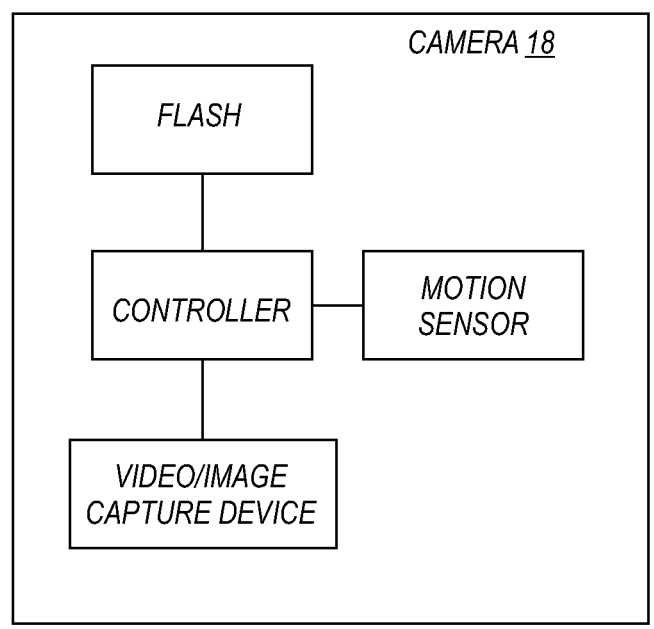
FIG. 7 is a block diagram of an exemplary camera.

FIGS. 1-7 are block diagrams of various examples of the present invention. FIG. 1 is a block diagram of a system 10 using capacitive energy storage. FIG. 1 shows a capacitive network 12, which is coupled to solar panel(s) 14. The capacitive network may be comprised of a single capacitor or multiple capacitors. Multiple capacitors could be placed in series, parallel, or in a series-parallel configuration. These configurations could exist as a single configuration or as multiple configurations depending on the voltage and current requirements of the operating circuit. FIG. 1 also shows control circuitry 16 and a trail camera 18 coupled to the capacitive network 12 and solar panel 14. The control circuitry 16 may include circuitry to control the operation of the camera, as well as circuitry to control the charging and discharging of the capacitive network 12. FIG. 1 also shows the connection of an external power source 20, which may be used to as an alternative of charging the capacitive network 12. The external power source may include an external charger, a battery, a fuel cell, a generator, or any other desired device. In the example of a trail camera, the camera 18 may include a video/image capture device, a controller, a motion sensor, a flash, as well as the control circuitry, displays, keypads, etc. FIG. 7 shows a block diagram of an exemplary trail camera 18.

The present invention greatly reduces the required maintenance of trail cameras. Capacitor technology using high dielectric films such as, but not limited to "Aerogel" allow large amounts of energy storage to exist in relatively small packages. Capacitors have a much greater (almost infinite) number of charge and discharge cycles compared to batteries. Capacitors are also far less affected by temperature. Using the concepts taught by the present invention, the density of the energy storage of capacitors allows adequate energy storage in capacitor form to replace batteries in trail cameras. Given the longer life properties of capacitors, trail cameras using capacitors instead of batteries dramatically reduce required user maintenance.

Figure 2:
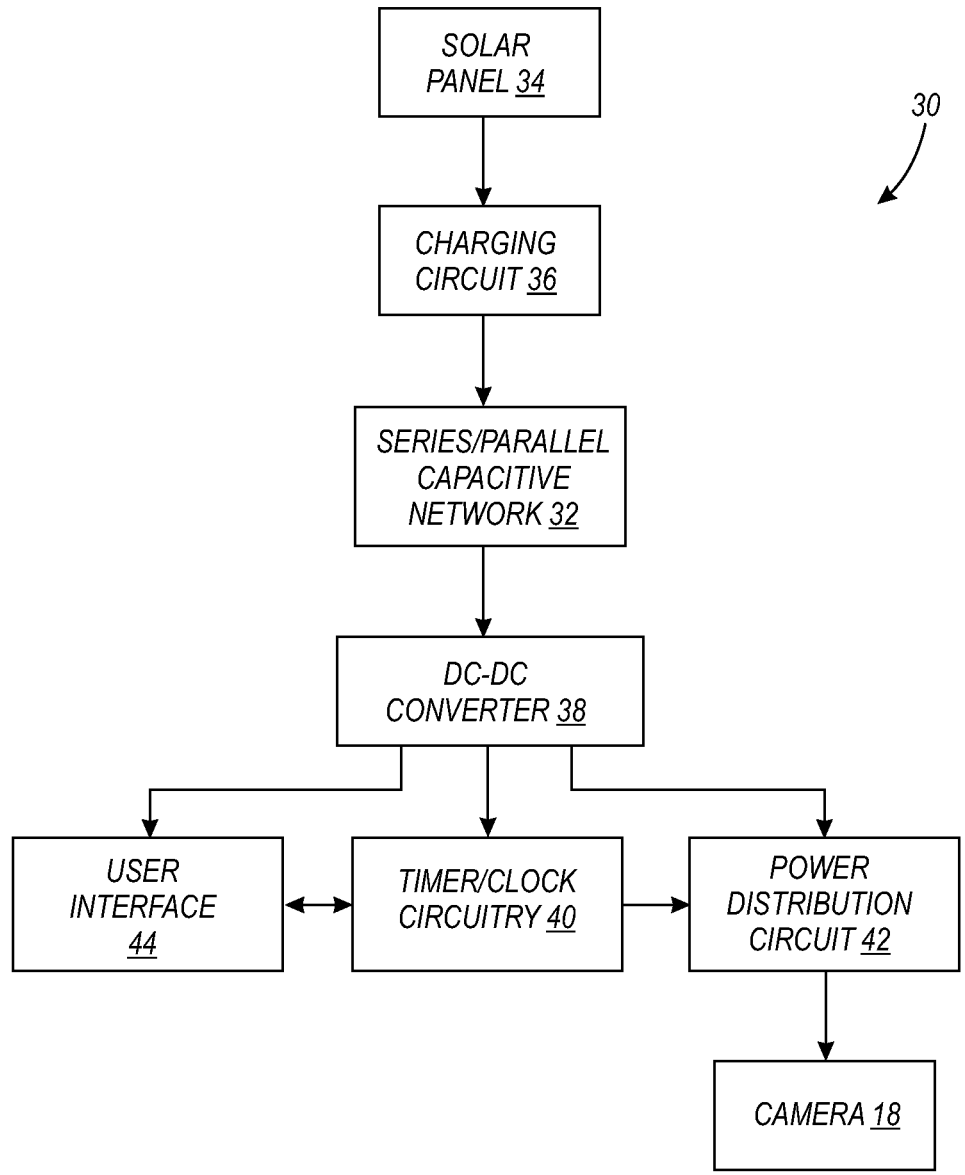
FIG. 2 is a block diagram of another example of a camera system using capacitive energy storage
Figure 3:
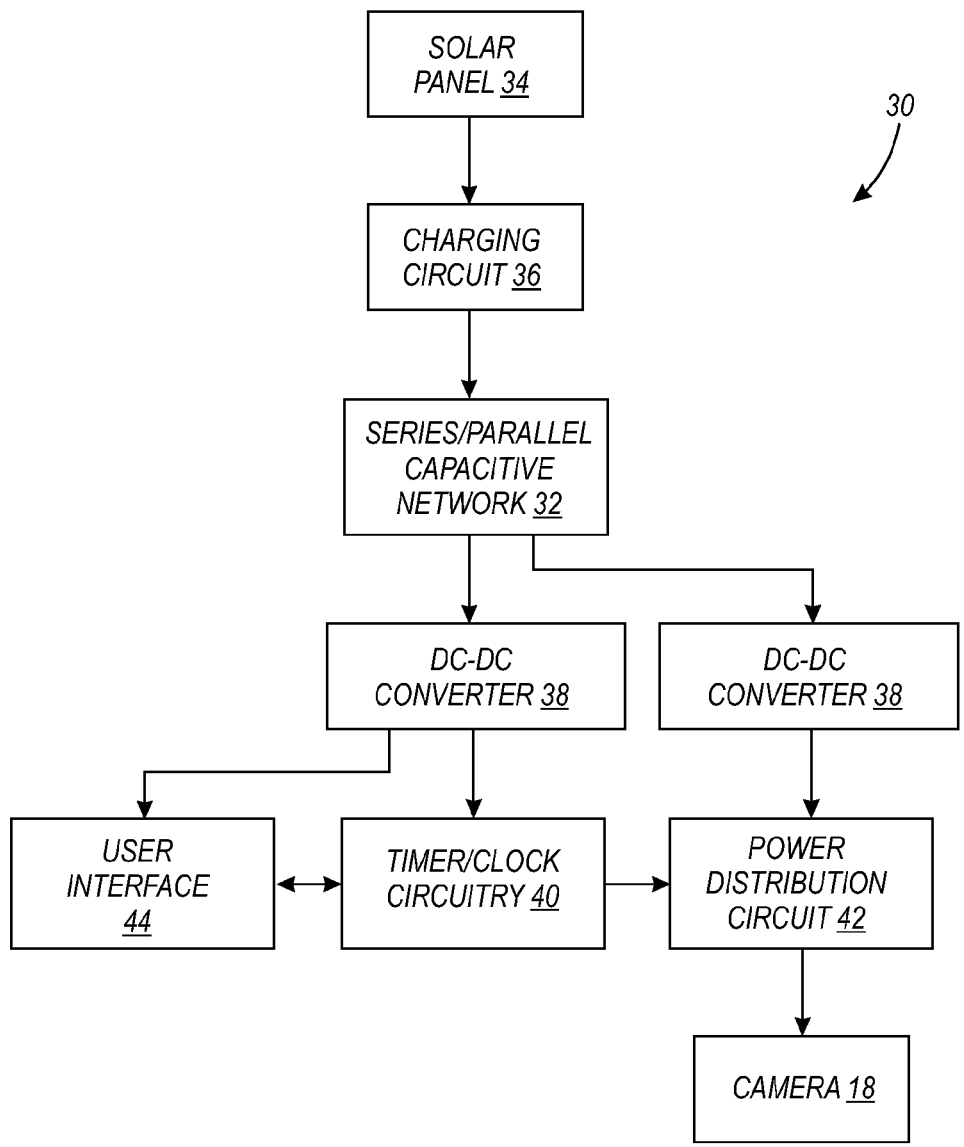
FIG. 3 is a block diagram of another example of a camera system using capacitive energy storage
Figure 4:
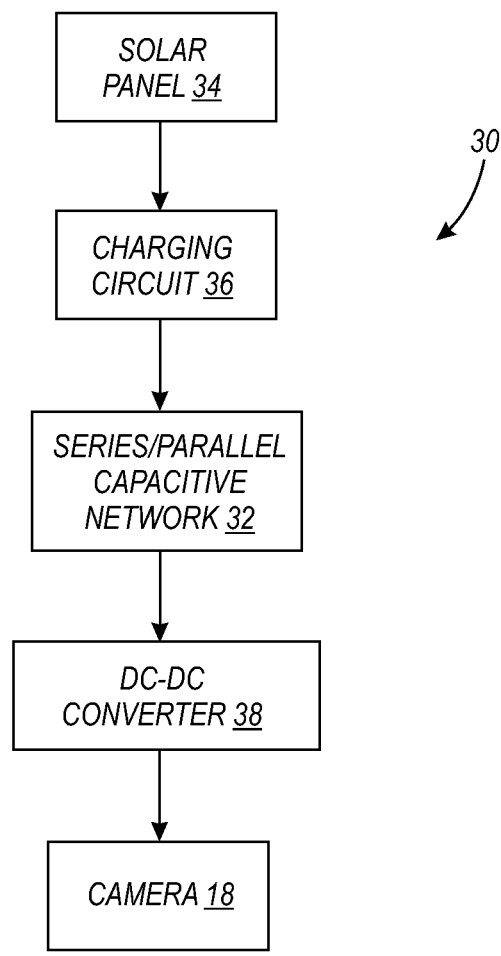
FIG. 4 is a block diagram of another example of a camera system using capacitive energy storage

FIG. 2 is a block diagram of one embodiment of a camera system of the present invention. This example describes trail camera, but this is not limited to the example shown. The system 30 includes a series/parallel capacitive network 32, such as the network described above. A solar panel 34 is used to charge the capacitive network 32. A charging circuit 36 is used to control the charging of the capacitive network 32. A DC-DC converter 38 is used to step the capacitor voltage up or down to obtain a steady power supply for the camera as the capacitor voltages drop. The DC-DC converter provides a voltage to both the timer/clock circuitry 40 and the power distribution circuit 42. FIG. 3 also shows a user interface block 44, which may include a display, lights, switches, keypad, etc., for use by a user to control the operation of the system 30. FIG. 3 is similar to the example shown in FIG. 2, except that a separate DC-DC converter is used by the power distribution circuit 42. FIG. 4 shows an example with just a camera 18 powered by DC-DC converter 38. FIG. 5 is a block diagram showing another embodiment of a camera system. FIG. 5 shows a block diagram of a system 50 that is similar to the systems described above, with a capacitive network for the DC-DC converter, user interface, and timer/clock circuitry. A second solar panel and charging circuit supplies power to battery(s) 32B, which provide power to the camera 18. FIG. 6 shows a block diagram of a system 50 where a camera 18 is powered by both a capacitive network 32A and batteries 32B. In this example, the camera can rely on battery power when no power is available from the capacitive network, which will increase the life of the batteries.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of operating a camera having control circuitry, the method comprising:
   providing one or more solar panels;
   storing energy from the one or more solar panels in one or more capacitors;
   at least partially disabling the charging of the one or more capacitors when the voltage of the one or more capacitors reaches a threshold voltage;
   providing control circuitry operatively coupled to the camera and to the one or more capacitors;
   using the energy stored in the one or more capacitors to provide power to the camera to capture images, wherein the camera is powered without using power from a non-photovoltaic power source such as a chemical battery; and
   configuring the control circuitry to prevent the camera from depleting energy stored in the one or more capacitors below a critical level so that the control circuitry will have enough energy available to sustain full circuit operation, including critical logic operation and time-keeping operation, during time periods when the energy stored in the one or more capacitors is insufficient to maintain operation of both the control circuitry and the camera.

2. The method of claim 1, further comprising using a DC-DC converter to step the capacitor voltage up or down to provide a steady voltage level to the camera, even as the capacitor voltages fall.

3. The method of claim 1, wherein the camera is powered at one or more predetermined times of day.

4. A system comprising:
   a camera configured to capture images;
   control circuitry operatively coupled to the camera for controlling the operation of the camera;
   one or more solar panels;
   a first capacitive network having one or more capacitors for storing energy from the one or more solar panels, wherein energy stored in the one or more capacitors of the first capacitive network is used to provide power to the camera; and a second capacitive network having one or more capacitors for storing energy from the one or more solar panels, wherein energy stored in the one or more capacitors of the second capacitive network is used to provide power to the control circuitry, and wherein the second capacitive network is configured such that it does not provide power to the camera.

5. The system of claim 4, further comprising a DC to DC converter coupled between the second capacitor network and the control circuitry to step up the voltage of the one or more capacitors as the capacitor voltages drop.

6. A system comprising:
   a camera;
   one or more solar panels;
   control circuitry operatively coupled to the camera for controlling the operation of the camera;
   one or more capacitors for storing energy from the one or more solar panels, wherein energy stored in the one or more capacitors is used to provide power to the control circuitry and the camera, wherein the one or more capacitors comprises first and second separate capacitive networks, and wherein the first capacitive network provides power to the control circuitry, and the second capacitive network provides power to the camera; and
   a DC to DC converter coupled between the one or more capacitors and the control circuitry to provide a stepped up voltage relative to the voltage of the one or more capacitors as the capacitor voltages drop so as to provide useable voltage to the control circuitry while the voltage of the one or more capacitors drops below the usable voltage levels of the control circuitry.

7. The system of claim 6, wherein the camera is activated for a time and duration, wherein the control circuitry controls the time and duration that the camera is activated.

8. The system of claim 6, wherein the camera is powered without using power from a chemical battery.

9. The system of claim 6, wherein the control circuitry is programmable by a user to activate the camera at predetermined intervals and durations.

10. The system of claim 6, wherein a second DC to DC converter provides a stepped up voltage relative to the voltage of the one or more capacitors as the capacitor voltages drop so as to provide a useable voltage level to the camera, even as the voltage of the one or more capacitors drops below the useable voltage level.

11. The system of claim 6, further comprising a charge control circuit coupled to the one or more capacitors and to the one or more solar panels for protecting the one or more capacitors from damaging voltage levels.

12. The system of claim 6, wherein the DC to DC converter is also coupled between the one or more capacitors and the camera to provide a stepped up voltage relative to the voltage of the one or more capacitors as the capacitor voltages drop so as to provide useable voltage to the camera while the voltage of the one or more capacitors drops below the usable voltage levels of the camera.

13. A method of operating a system having a camera, the method comprising:
  providing one or more solar panels;
  storing energy from the one or more solar panels in one or more capacitors;
  providing control circuitry operatively coupled to the camera and to the one or more capacitors;
  using the energy stored in the one or more capacitors to provide power to the camera to capture images, wherein the camera is powered without using power from a non-photovoltaic power source such as a chemical battery;
  using a DC-DC converter to step the capacitor voltage up or down to provide a desired steady voltage level to the camera, even as the capacitor voltages fall; and
  configuring the control circuitry to prevent the camera from depleting energy stored in the one or more capacitors below a critical level so that the control circuitry will have enough energy available to sustain full circuit operation, including critical logic operation and time-keeping operation, during time periods when the energy stored in the one or more capacitors is insufficient to maintain operation of both the control circuitry and the camera.

14. The method of claim 13, further comprising at least partially disabling the charging of the one or more capacitors when the voltage of the one or more capacitors reaches a threshold voltage.

15. The method of claim 13, further comprising at least partially disabling the charging of the one or more capacitors when the voltage of the one or more capacitors reaches a threshold value.

16. A method of operating a camera having control circuitry, the method comprising:
  providing one or more solar panels;
  storing energy from the one or more solar panels in one or more capacitors, said one or more capacitors being operatively coupled to the camera and the control circuitry;
  wherein the one or more solar panels and the one or more capacitors generate and store energy sufficient to operate the control circuitry indefinitely;
  at least partially disabling the charging of the one or more capacitors when the voltage of the one or more capacitors reaches a threshold voltage;
  configuring the charge control circuit to divert energy from the one or more solar panels away from the one or more capacitors to protect the capacitors from damage due to over-voltage, but without shunting energy out of the one or more capacitors;
  providing control circuitry operatively coupled to the camera and to the one or more capacitors;
  using the energy stored in the one or more capacitors to provide power to the camera; and
  configuring the control circuitry to prevent the camera from depleting energy stored in the one or more capacitors below a critical level so that the control circuitry will have enough energy available to sustain operation during time periods when the energy stored in the one or more capacitors is insufficient to maintain operation of both the control circuitry and the camera.

17. The method of claim 16, wherein the camera is powered without using power from a non-photovoltaic power source such as a chemical battery.

\* \* \* \* \*